United States Patent Office 3,126,294
Patented Mar. 24, 1964

3,126,294
MOLD RELEASE MATERIAL
Richard J. Pichler, Chicago, Ill., assignor to Wilson & Co., Inc., a corporation of Delaware
No Drawing. Filed Mar. 28, 1960, Ser. No. 17,777
4 Claims. (Cl. 117—5.3)

This invention relates to the casting of metals. More particularly the invention relates to the casting of copper. Still more particularly it relates to the casting of copper wire bars.

The electrical industry, as known today, has been made possible by the production of high purity, high conductivity copper wire. Impure copper is refined, as by the electrolytic method, to remove impurities so that a copper is produced having a purity in excess of about 98 or 99%. This high purity copper metal is cast into so-called wire-bars which are subjected to a drawing operation to produce wire of uniform cross-sectional configuration and uniform conductivity.

Production of copper wire requires not only that the copper be free of impurities but also that the wirebar forming operation be conducted under conditions to avoid introducing new impurities during the casting operation. In order to give a satisfactory drawing operation, a cast copper wirebar must have a clean relatively smooth surface and be free of detrimental inclusions on the wire bar as well as free of defects within the wirebar.

Molten copper is generally cast into suitably shaped wirebars in copper molds, although other metallic molds can be used. In order to prevent the molten metal from welding itself to the mold surface, a coating is applied to the interior surface of the mold often referred to as a mold release material. The material in common use by the copper wirebar casting industry as a mold release material has been bone ash. Bone ash is predominantly calcium phosphate and calcium carbonate plus some non-volatile residue material. While bone ash has been acceptable, it has presented the problem of non-uniformity in composition due to variations in impurities of the source material which impurities are difficult to eliminate.

It has now been discovered that a markedly less expensive material may, by proper processing, be converted to a mold release or mold coating material of substantially uniform chemical character, free from organic material volatilizable during the casting operation, of improved refractoriness and of good adherence to mold walls during the pouring operation.

The useful new materials fall into the category of aluminas. These materials have a high content of aluminum oxide ($Al_2O_3$) and are substantially free of water of hydration. Materials useful for the intended purpose are produced from certain high purity bauxites as well as high purity precipitated aluminas by calcining the aluminas as hereinafter described.

A representative starting material for production of an alumina mold release material is a precipitated hydrated alumina having the following characteristics:

| | Percent |
|---|---|
| $Al_2O_3$ | 64.4 |
| $Na_2O$ | 0.45 |
| $SiO_2$ | 0.05 |
| $Fe_2O_3$ | 0.02 |
| Free water | 0.21 |
| Combined water | 34.9 |
| Specific gravity | 2.4 |

Such an alumina hydrate is converted to material useful as a mold release material by calcining at temperatures in the range of between 1800° F. and about 2200° F. This calcining operation requires careful control because calcining at too low a temperature for too short a period of time fails to remove substantially all of the water of hydration and calcining at temperatures above about 2200° F., for example, at 2500° F. destroys one of the necessary properties of a mold release material, namely, ability to adhere to the mold surface.

When properly calcined, alumina will adhere to the mold surface not only at the time of application but also during the pouring of the molten copper.

The invention will be described with reference to the production of a copper mold release material from precipitated alumina hydrate. Alumina hydrate, for example, produced by the Bayer process, is available as unground grain material or in comminuted form. For use as a mold release material, calcined alumina is preferably of a particle size capable of passing through a 200 mesh screen and preferably of a size such that 95% passes through a 325 mesh U.S. standard screen. Comminution to this particle size is usually carried out after calcining. Material may be comminuted before calcining and the material agglomerated during calcining subsequently recomminuted.

The method of preparing molds to accept molten copper for solidification without adherence or welding of the molten material to said mold comprises slurrying the alumina with a liquid medium and applying the slurry to the surface of a mold by spraying, painting or flowing the slurry into position. Slurrying mediums, other than water, may be used but water is the most economical and is the preferred medium because it vaporizes without leaving an objectional residue. Slurries may be varied in the concentration of solids present depending upon the method of application being used and may contain up to about 80% alumina solids. For spraying operations, a more dilute slurry is utilized and the solids concentration may be as low as 2–5% by weight of the slurry. In general, however, for spraying operations, a slurry containing between about 10% and 25% of alumina solids is preferred.

The temperature of the mold at the time of application of the slurry must be closely controlled so as to obtain reasonable rapid evaporation of the water or other medium without disrupting the continuity of the deposited layer of alumina. If the temperature of the mold is too high, rapid volatilization of the liquid applied thereto may blow solids from the mold surface, leaving unprotected areas where molten metal can adhere to the mold. If the mold temperature is too low, the liquid of the slurry is evaporated slowly making for a time consuming operation and if too much slurry is deposited too rapidly it can result in tears or formation of runs which result in a non-uniform coating.

In order to remove the slurrying medium in an economically feasible length of time, substantially all of which medium must be volatilized before copper can be run into the mold, the mold must be heated to a temperature approaching the boiling point of the liquid medium at atmospheric pressure and preferably to a temperature in the range between 25° F. and 75° F. above the boiling point of the liquid medium. Conditions maintained at a mold surface may be subject to change either by cooling the mold which is too high in temperature through evaporation of liquid medium or by change in pressure conditions whereby liquid medium is volatilized at higher or lower temperatures. When water is the slurrying medium, the optimum mold temperature for application of alumina slurry is about 250° F. At 250° F. water evaporates with sufficient rapidity to avoid runs and slow enough to avoid gas evolution which could disturb the deposited alumina layer. When the initial temperature of the mold is about 225° F. the mold coating operation is a slow one if runs which destroy uniformity of the coating are to be avoided, since evaporation of water cools the mold to a point where substantially no water is being vaporized. Mold coating operations are generally carried out at mold temperatures varying from about 212° F. to about 287° F.

When the mold temperature is low at the time of applying the alumina slurry coating, the temperature of the mold can be raised to complete removal of the liquid medium. When a mold temperature in the upper portion of the useful range for coating operations is utilized, the mold temperature may be raised, after alumina deposition is arrested, to complete removal of the liquid medium or the mold may be maintained at the same temperature for a period of time up to about an hour after deposition of aqueous slurry has been completed.

In addition to the inertness and uniformity of chemical nature of aluminas calcined at temperatures in the range between about 1800° F. and 2000° F., these aluminas are readily comminuted to a particle size of the order of 1 to 10 microns which material has the advantages of forming aqueous slurries requiring only mild agitation to remain substantially uniform in solids content and of forming coatings drying at reasonably low temperatures to produce a mold release layer containing no material volatilizable when molten copper is deposited in the alumina coated mold.

Useful aluminas, consisting of aluminum oxide substantially in the alpha-$Al_2O_3$ phase after calcining, exhibit the following general properties:

| | | |
|---|---|---|
| $Al_2O_3$ content | percent | 98–99.6 |
| $Na_2O$ content | do | 0.05–0.75 |
| $SiO_2$ content | do | 0.01–0.15 |
| $Fe_2O_3$ content | do | 0.03–0.2 |
| Loss on ignition | do | 0.2–1.0 |
| Water by sorption and ignition test | do | 0.1–2.5 |
| Specific gravity | | 3.6–3.9 |

Reference is made to water as determined by the sorption and ignition test as a property of the alumina. Water determined by this test is not bound water. Water determined by this test is that absorbed by calcined alumina under special conditions and is a measure of the inertness of the alumina. In determining how inert the alumina is, a measured quantity of alumina is exposed to an atmosphere having 50% relative humidity to determine the increase in weight due to absorbed moisture. This wetted alumina is heat treated or ignited at a temperature of 1100° C. to determine the loss of weight. This test gives an indication of the amount of sorbable water to be found in the alumina, i.e., the amount of volatile water which could be expected to be freed from the alumina during the copper pouring operation.

The invention will be further illustrated by the following examples which are given by way of illustration and without any intention that the invention be limited thereto.

*Example I*

Precipitated alumina hydrate was calcined at approximately 1800° F. until it exhibited the following characteristics:

| | |
|---|---|
| $Al_2O_3$ | 99%. |
| $Na_2O$ | 0.45%. |
| $SiO_2$ | 0.02%. |
| $Fe_2O_3$ | 0.03%. |
| Loss on ignition (1100° C.) | 0.6%. |
| Tot. $H_2O$ (based on exposing calcined alumina to 50 percent relative humidity and igniting) | 1%. |
| Bulk density, loose | 55 lb./cu. ft. |
| Bulk density, packed | 68 lb./cu. ft. |
| Specific gravity | 3.6–3.8. |

50 parts by weight of the calcined alumina was ground to a particle size 100% of which would pass a 325 mesh U.S. standard screen. The screened alumina was mixed with 250 parts by weight of water and the resultant slurry worked through a 300 mesh U.S. standard screen to produce a smooth slurry containing no aggregates which could clog a sprayer. The slurry was maintained uniform in solids content by agitation and the cavity and adjacent area of the copper mold was sprayed with slurry until the coating had attained a thickness of approximately 0.003 inch.

At the time of application of the slurry, the copper mold was heated to approximately 250° F.

Electrolytic copper was heated to 2300° F. in an electric furnace and poured into the alumina coated mold. The molten copper was allowed to cool below red heat and to solidify and then the mold and casting were quenched in cold water. Upon inversion of the mold during the quenching operation, the copper casting fell free of the mold. Upon inspection of the casting without any washing or scrubbing, it was determined that the side and bottom surfaces of the wire bar were clean, i.e., essentially free of alumina material, bright and smooth.

*Example II*

Precipitated alumina hydrate of approximately 3 molds of water of crystallization was calcined at approximately 2000° F. until it exhibited the following characteristics:

| | |
|---|---|
| $Al_2O_3$ | 99%. |
| $SiO_2$ | 0.02%. |
| $Fe_2O_3$ | 0.03%. |
| $Na_2O$ | 0.45%. |
| Loss on ignition (1100° C.) | 0.4%. |
| Tot. $H_2O$ (based on exposing calcined alumina to 50 percent relative humidity and igniting) | 0.7%. |
| Bulk density, loose | 55 lb./cu. ft. |
| Bulk density, packed | 68 lb./cu. ft. |
| Specific gravity | 3.6–3.8. |

50 parts by weight of the calcined alumina was ground to a particle size 100% of which would pass a 325 mesh U.S. standard screen. The screened alumina was mixed with 250 parts by weight of water and the resultant slurry worked through a 300 mesh U.S. standard screen to produce a smooth slurry containing no aggregates which could clog a sprayer. The slurry was maintained uniform in solids content by agitation and the cavity and adjacent area of the copper mold was sprayed with slurry until the coating had attained a thickness of approximately 0.003 inch.

At the time of application of the slurry, the copper mold was heated to approximately 295° F.

Electrolytic copper was heated to 2300° F. in an electric furnace and the casting conducted as in Example I. The cast copper bar, after quenching, fell free upon inversion of the mold and had clean surfaces similar to those of the bars of Example I.

*Example III*

Precipitated alumina hydrate was calcined at approximately 2100° F. until it exhibited the following characteristics:

| | |
|---|---|
| $Al_2O_3$ | 99%. |
| $SiO_2$ | 0.02%. |
| $Fe_2O_3$ | 0.03%. |
| $Na_2O$ | 0.45%. |
| Loss on ignition (1100° C.) | 0.2%. |
| Tot. $H_2O$ (based on exposing calcined alumina to 50 percent relative humidity and igniting) | 0.3%. |
| Bulk density, loose | 52 lb./cu. ft. |
| Bulk density, packed | 68 lb./cu. ft. |
| Specific gravity | 3.7–3.9. |

50 parts by weight of the calcined alumina was ground to a particle size 100% of which would pass a 325 mesh U.S. standard screen. The screened alumina was mixed with 250 parts by weight of water and the resultant slurry worked through a 300 mesh U.S. standard screen to produce a smooth slurry containing no aggregates which could clog a sprayer. The slurry was maintained uniform in solids content by agitation and the cavity and adjacent area of the copper mold was sprayed with slurry until the coating had attained a thickness of approximately 0.003 inch.

At the time of application of the slurry, the copper mold was heated to approximately 250° F. After the spraying operation was complete, the mold was heated to 300° F. to insure that the coating contained no moisture which could interfere with the casting operation.

Electrolytic copper was heated to 2300° F. in an electric furnace and poured into the alumina coated mold. The molten copper was allowed to cool below red heat and to solidify and then the mold and casting were quenched in cold water. Upon inversion of the mold during the quenching operation, the copper casting fell free of the mold. Upon inspection of the casting without any washing or scrubbing, it was determined that the side and bottom surfaces of the wire bar were clean, i.e., essentially free of alumina material, bright and smooth.

I claim:

1. The method of preparing a mold made of copper to accept molten copper for solidification without adherence to said mold which comprises slurrying precipitated alumina hydrate which has been calcined at a temperature in the range between 1800° F. and 2200° F. in a liquid medium substantially completely volatilizable at temperatures between 212° F. and 287° F. at atmospheric pressure, said calcined hydrate consisting essentially of

| | Percent |
|---|---|
| $Al_2O_3$ | 98–99.6 |
| $Na_2O$ | 0.05–0.75 |
| $SiO_2$ | 0.01–0.15 |
| $Fe_2O_3$ | 0.03–0.2 | and having a specific gravity in the range between 3.6 and 3.9 and a particle size such that 100% will pass through a 200 mesh screen and showing

| | Percent |
|---|---|
| $H_2O$ by sorption and ignition test | 0.1–2.5 |
| Loss on ignition | 0.2–1.0 | heating the mold to a temperature in the range between about 25° F. and 75° F. above the boiling temperature of said liquid medium, applying a smooth coating of said slurry to the interior surface of the mold, and volatilizing said liquid medium whereby a substantially liquid medium-free coating of said alumina remains adhered to the surface of said mold.

2. The method of preparing a mold made of copper to accept molten copper for solidification without adherence to said mold which comprises slurrying precipitated alumina hydrate which has been calcined at a temperature in the range between 1800° F. and 2200° F. in water, said calcined hydrate consisting essentially of

| | Percent |
|---|---|
| $Al_2O_3$ | 98–99.6 |
| $Na_2O$ | 0.05–0.75 |
| $SiO_2$ | 0.01–0.15 |
| $Fe_2O_3$ | 0.03–0.2 | and having a specific gravity in the range between 3.6 and 3.9 and a particle size such that 100% will pass through a 200 mesh screen and showing

| | Percent |
|---|---|
| $H_2O$ by sorption and ignition test | 0.1–2.5 |
| Loss on ignition | 0.2–1.0 | heating said mold to a temperature in the range between about 212° F. and about 287° F., applying a smooth coating of said slurry to the interior surface of said mold, and volatilizing the water whereby a substantially water-free coating of said alumina remains adhered to the surface of said mold.

3. The method of preparing a mold made of copper to accept molten copper for solidification as defined in claim 2 in which the content of heat treated, precipitated alumina hydrate in the water slurry is in the range between 2% and 20% by weight of.

4. The method of preparing a mold made of copper to accept molten copper for solidification as defined in claim 2 in which the content of heat treated, precipitated alumina hydrate in the water slurry is in the range between 10% and 25% by weight of.

References Cited in the file of this patent

UNITED STATES PATENTS

| 1,662,354 | Williams | Mar. 13, 1928 |
|---|---|---|
| 1,861,562 | Beck | June 7, 1932 |
| 1,882,972 | Schlecht et al. | Oct. 18, 1932 |
| 1,990,075 | Horak | Feb. 5, 1935 |
| 2,090,408 | Vance | Aug. 17, 1937 |
| 2,144,532 | Hall | Jan. 17, 1939 |
| 2,685,528 | Robinson | Aug. 3, 1954 |
| 2,964,383 | Kamlet | Dec. 13, 1960 |